(12) United States Patent
Breitbart et al.

(10) Patent No.: US 6,381,609 B1
(45) Date of Patent: Apr. 30, 2002

(54) SYSTEM AND METHOD FOR SERIALIZING LAZY UPDATES IN A DISTRIBUTED DATABASE WITHOUT REQUIRING TIMESTAMPS

(75) Inventors: Yuri J. Breitbart, Scotch Plains, NJ (US); Raghavan V. Komondoor, Madison, WI (US); Rajeev Rastogi, New Providence, NJ (US); Srinivasan Seshadri, Basking Ridge, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/346,798

(22) Filed: Jul. 2, 1999

(51) Int. Cl.[7] .............................................. G06F 17/30
(52) U.S. Cl. ..................... 707/103; 707/10; 707/102; 707/104.1
(58) Field of Search ...................... 707/10, 102, 103, 707/104.1

(56) References Cited

U.S. PATENT DOCUMENTS 5,970,496 A * 10/1999 Katzenberger .............. 707/102
5,999,931 A * 12/1999 Breitbart et al. .............. 707/10

OTHER PUBLICATIONS (IEEE publication, May, 200) View–based consistency and its implemntation by Hugan, Z et al. Cluster Computing and the Grid, 2001, Proc., pp. 74–81.*
(IEEE publication Oct. 1999) Database replication: if you be lazy be consistent by J. Holliday et al. Reliable Distributed Systems. 1999 Proc. pp. 304–305.*
Parvathi Chundi, Daniel J. Rosenkrantz, S. S. Ravi. Department of Computer Science, University at Albany—State University of New York. Deferred Updates and Data Placement in Distributed Databases. Research Supported by NSF Grant CCR–90–06396, (7 pages).
J. Gray and A. Reuter, *Transaction Processing: Concepts and Techniques*, Chapter 7: *Isolation Concepts*, pp. 375, 390–391. Morgan–Kaufmann Publishers, San Mateo, CA, 1993.

* cited by examiner

*Primary Examiner*—Diane D. Mizrahi
(74) *Attorney, Agent, or Firm*—Hitt Gaines & Boisbrun, PC

(57) ABSTRACT

A system for, and method of, ensuring serialization of lazy updates in a distributed database described by a directed acyclic copy graph. In one embodiment, the system includes: (1) a forest construction module that creates a forest having trees and edges from the directed acyclic copy graph and (2) a propagation module, associated with the forest construction module, that employs the edges of the forest to propagate the lazy updates among replicas in the distributed database and ensure the serialization.

26 Claims, 5 Drawing Sheets

DAG

FOREST

SYSTEM AND METHOD FOR SERIALIZING LAZY UPDATES IN A DISTRIBUTED DATABASE WITHOUT REQUIRING TIMESTAMPS

TECHNICAL FIELD OF THE INVENTION

The present invention is directed, in general, to distributed databases and, more specifically, to a system and method for serializing lazy updates in a distributed database without requiring timestamps.

BACKGROUND OF THE INVENTION

Database systems were first implemented at only a single database site. As the number of distributed applications requiring access to the database increased, the complexity, size and the time required to access the database systems also increased. Shortly thereafter, a single database site became unable to process all the information in a timely manner.

To correct this database processing problem, companies developed new database systems in which the database was replicated at different sites along a network. With the use of replicated databases, distributed applications were able to achieve a higher level of performance, reliability and availability. However, the higher level of performance came with a price.

Replicated databases improved performance, but management of the replicated data became vastly more complicated. Gigabytes of data are replicated in distributed data warehouses and various World Wide Web sites on the Internet. In telecom as well as data networks, network management applications require real-time dissemination of updates to replicas with strong consistency guarantees.

Two broad approaches have been developed to handle the problem of replica updates in a distributed database system, an eager protocol and a lazy protocol. The eager protocol updates all the replicas of an item as part of a single transaction. Thus, an eager protocol ensures that executions are serializable. However, a major disadvantage of an eager protocol's algorithms is that the number of operations in the transaction increases with the degree of replication, and since deadlock probability is proportional to the fourth power of the transaction size, eager protocols are unlikely to scale beyond a small number of sites.

In contrast, the lazy protocol posts updates to replicas through independent transactions that are spawned by the original updating transaction after it commits. Thus, the effective size of a transaction is reduced and the overall performance of the system improves due to fewer deadlocks. However, transaction execution must be orchestrated carefully to ensure serializability across the entire distributed database.

Due to its superior performance benefits, a number of conventional database management programs (e.g., Sybase®, Oracle®, CA-OpenIngres®) provide support for updating via a lazy protocol. Specifically, these programs provide an option in which each transaction executes locally, and then is propagated asynchronously to replicas after it commits (the replicas at each site are updated in the context of a separate transaction). Since each transaction executes locally and independently, the systems do not require multi-site commit protocols (e.g., two-phase commit) which tend to introduce blocking and are thus not easily scalable.

A problem, however, with the lazy replication approaches of most conventional systems is that they can easily lead to non-serializable executions. For instance, it is possible for the same data item to be concurrently updated at two different sites, thus resulting in an update conflict. Currently, commercial systems use reconciliation rules (e.g., install the update with the later timestamp) to merge conflicting updates. These rules do not guarantee serializability, unless the updates are commutative. Therefore, what is needed in the art is a way to guarantee serializability of updates within a replicated database system.

SUMMARY OF THE INVENTION

To address the above-discussed deficiencies of the prior art, the present invention provides a system for, and method of, ensuring serialization of lazy updates in a distributed database described by a directed acyclic copy graph. In one embodiment, the system includes: (1) a forest construction module that creates a forest having trees and edges from the directed acyclic copy graph and (2) a propagation module, associated with the forest construction module, that employs the edges of the forest to propagate the lazy updates among replicas in the distributed database and ensure the serialization.

The present invention therefore introduces the broad concept of restructuring the copy graph describing the distributed database into a forest of trees, and then employing the edges of the forest to control propagation of updates through the distributed database. In this manner, serialization can be guaranteed in distributed databases described by directed acyclic copy graphs.

In one embodiment of the present invention, each of the trees comprises a node with exactly one parent. In a related embodiment, each of the trees further comprises a root having no parent.

In one embodiment of the present invention, the propagation module propagates the lazy updates without employing timestamps. While timestamps may be employed, the present invention does not require them to guarantee serialization of lazy updates.

In one embodiment of the present invention, the forest construction module arbitrarily selects a sink node of the forest. Alternatively, the forest construction module can select a sink node according to one or more predetermined rules. A sink node is a node in a directed acyclic copy graph that does not have a directed edge to another node in the directed acyclic copy graph.

In one embodiment of the present invention, the propagation module propagates transactions within a child tree of the forest only to selected children of the child tree. In a related embodiment, the propagation module propagates transactions sequentially along edges of the forest. The edges are the propagation paths from a source database site to destination database site within the forest.

In one embodiment of the present invention, a counterpart of the system is located at each replica of the distributed database. A replica is a site that comprises a copy of the whole database or a site that contains at least one element of the database. Alternatively, the system may be located at a single replica site, or at fewer than all sites.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
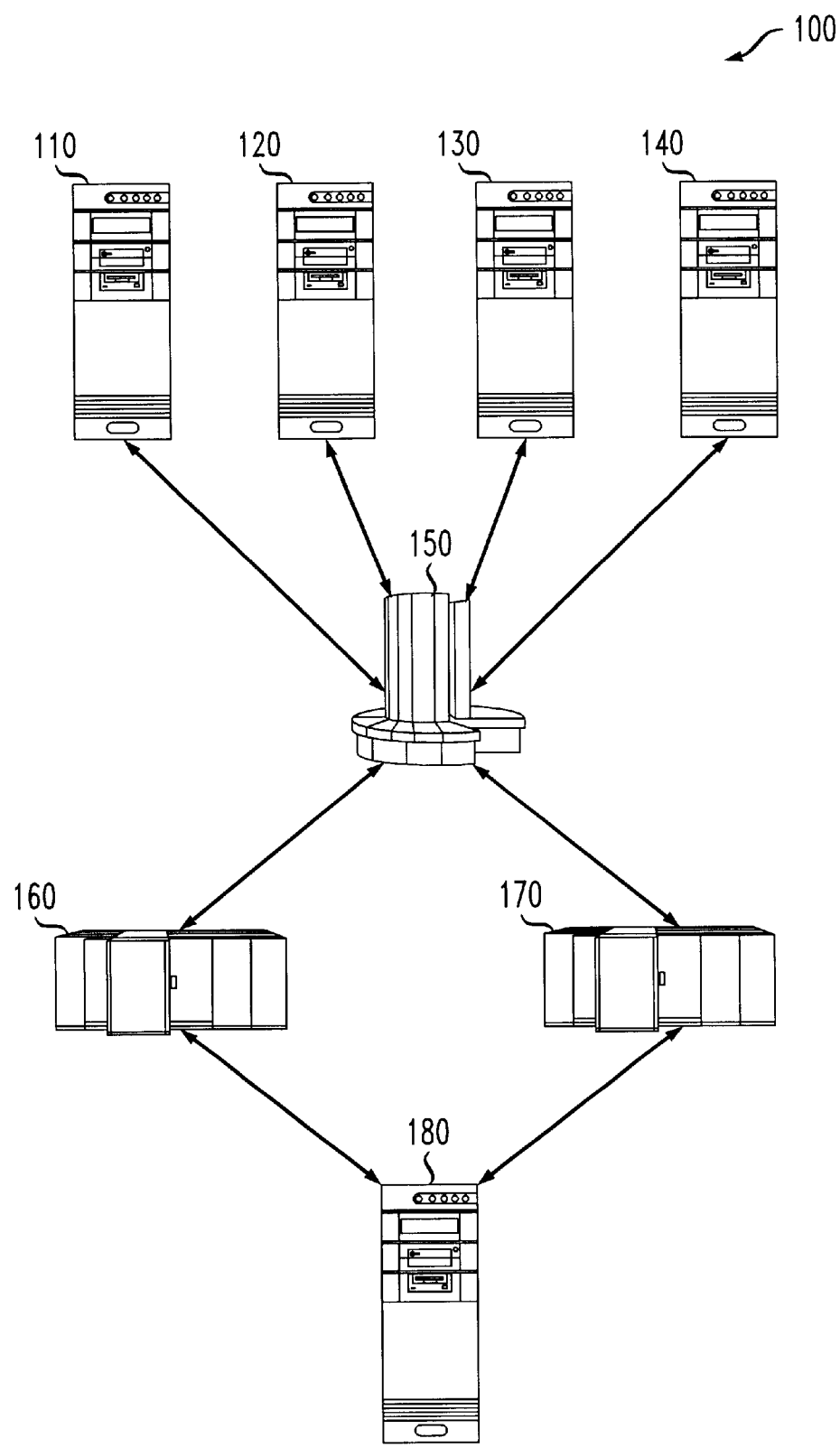
FIG. 1 illustrates a block diagram of a distributed database system that forms one environment within which the present invention can operate.

Referring initially to FIG. 1 illustrated is a block diagram of a distributed database system, generally designated 100, that forms one environment within which the present invention can operate. The distributed database system 100 comprises a plurality of database computer systems operating at remote sites 110, 120, 130, 140, a main database computer system 150, department database computer systems 160, 170 and an analyst computer system 180. In the illustrated embodiment of the present invention, the distributed database system 100 may comprise any number of remote sites 110, 120, 130, 140, main database computer systems 150, department database computer systems 160, 170 and analyst computer systems 180.

The remote sites 110, 120, 130, 140 comprise replicated data and are coupled to the main database computer system 150 via a combination of networks and telecommunications lines. The main database computer system 150 comprises the primary database for the distributed database system 100. In another embodiment of the present invention, the main database computer system 150 comprises a primary database site for a portion of the data within the distributed database system 100.

The main database computer system 150 is also coupled to the department database computer systems 160, 170 via a combination of networks and telecommunications lines. The department database computer systems 160, 170 comprise a secondary site for the replicated data within the distributed database system 100.

The analyst database computer system 180 is coupled to the department database computer system 160 and to the department database computer system 170 via a combination of networks and telecommunications lines. The analyst database computer system 180 comprises replicated data of the distributed database system 100.

In the illustrated embodiment, each of the remote sites 110, 120, 130, 140, the main database computer system 150, the department database computer systems 160, 170 and the analyst database computer system 180 also comprise distributed applications that access data contained within the replicated databases and programs which propagate the transaction updates throughout the distributed database system 100. In another embodiment of the present invention, only the main database computer system 150 and the department database computer systems 160, 170 contain programs which propagate database updates throughout the distributed database system 100.

In a third embodiment of the present invention, any one of the remote sites 110, 120, 130, 140, the main database computer systems 150, the department database computer systems 160, 170 and the analyst computer system 180 may be either the primary site or a secondary site for a plurality of database items in the distributed database system 100. In all cases, only one distributed database site may be the primary site for a particular database item.

Figure 2:
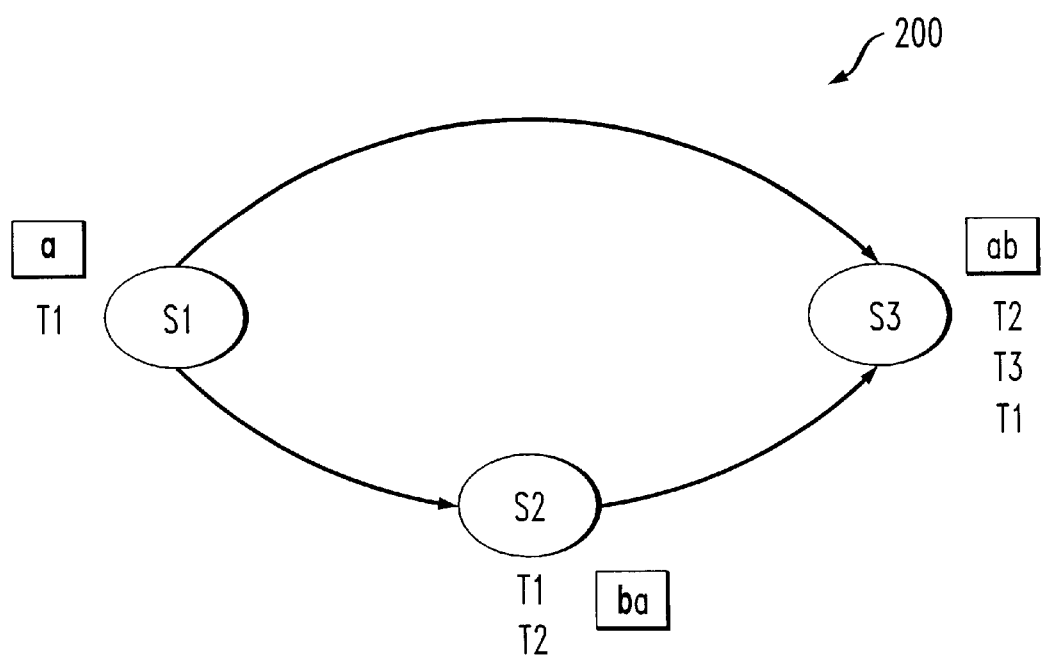
FIG. 2 illustrates a block diagram of a directed acyclic copy graph with non-serializable execution problem.

Turning now to FIG. 2, illustrated is a block diagram of a directed acyclic copy graph ("DAG") with non-serializable execution problem, generally designated 200. The problem of ensuring execution serializability of a copy graph is that existing approaches use lazy replication protocols that guarantee serializability if and only if the undirected graph obtained from a copy graph is acyclic. However, since replica updates are propagated arbitrarily, their algorithms cannot ensure serializability if the copy graph is a directed acyclic copy graph. This non-serializability problem is illustrated by FIG. 2.

Consider the distributed system, shown in FIG. 2, with three sites and two items a and b. The primary site for a is S1 with secondary copies at S2 and S3, while the primary site for b is S2 and a secondary copy is at S3. The copy graph is the DAG 200 as shown in FIG. 2.

Now consider three transactions, T1 at site S1, T2 at site S2 and T3 at site S3. T1 simply updates item a, T2 reads a and writes b while T3 reads both items a and b. Assuming lazy propagation of updates to replicas, it is possible for T1's update to reach site S2 before T2 executes. It is also possible for T1's update to reach site S3 after T2's update to b has been applied and transaction T3 has completed execution. Since T1 is serialized before T2 at site S2, but T2 is serialized before T1 at site S3, applying T1's update would corrupt the replica data at site S3. Therefore, the current lazy propagation protocols cannot guarantee serializability of T1's update at site S3.

Background information concerning copy graphs is discussed in Transaction Processing: Concepts and Techniques by Jim Grey and Andreas Reuter, Morgan Kauffman Publishers 1993. Background information concerning serializability is discussed in Deferred Updates and Data Placement in Distributed Databases by P. Chundi, et al., in Proceedings of the Twelfth International Conference on Data Engineering, New Orleans, La., 1996. The foregoing publications are incorporated herein by reference.

Figure 3:
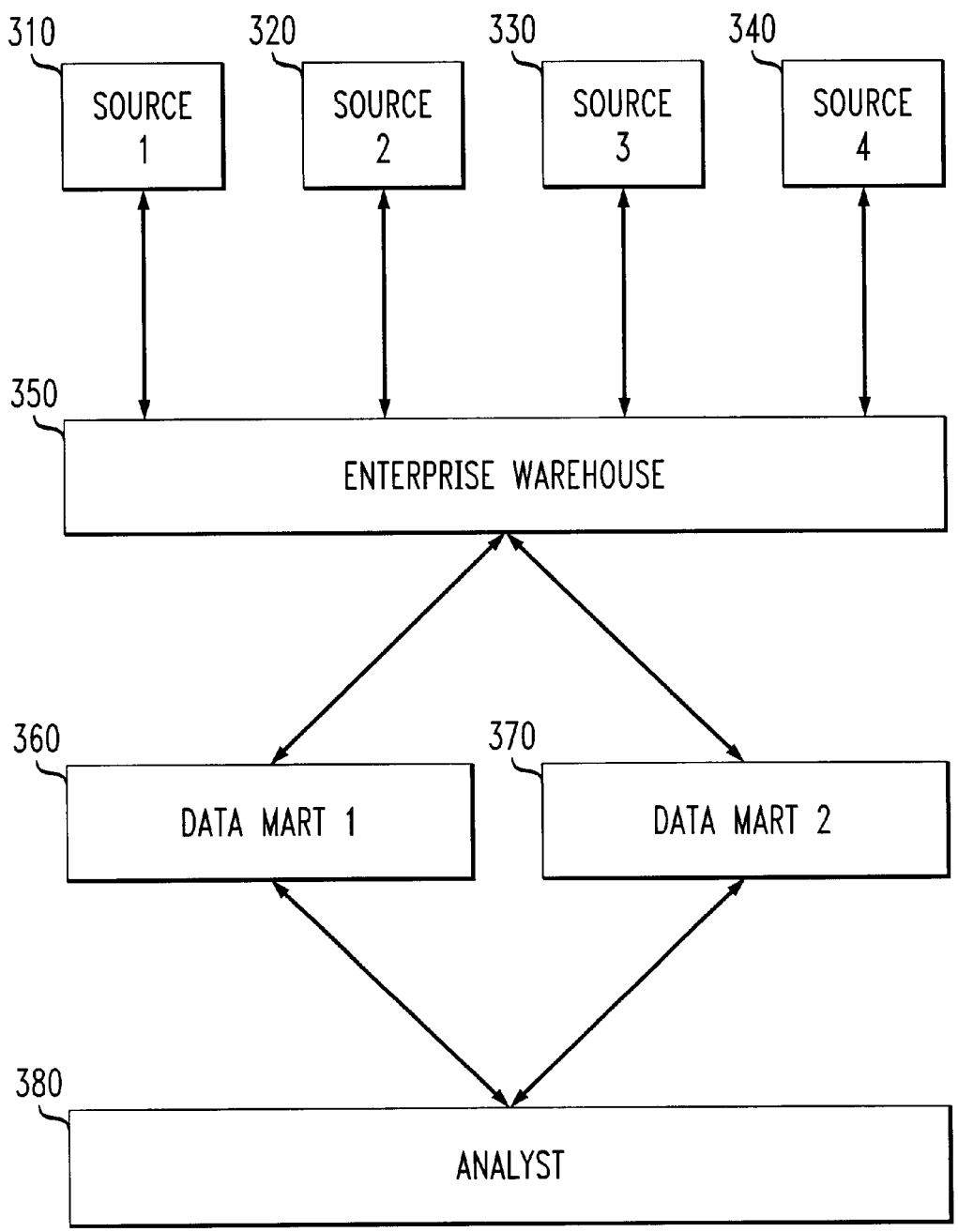
FIG. 3 illustrates a block diagram of a typical data warehousing environment.

Turning now to FIG. 3, illustrated is a block diagram of a typical data warehousing environment, generally designated 300. The data warehousing environment 300 is one example of a natural situation in which the copy graph for propagating updates is a DAG.

The data warehousing environment 300 typically comprises sources 310, 320, 330, 340, an enterprise warehouse 350, data marts 360, 370 and an analyst 380. The sources 310, 320, 330, 340 are coupled to the enterprise warehouse 350. The sources 310, 320, 330, 340 collect data from the warehousing environment and send the data to the enterprise warehouse 350 via a network (not shown)

The enterprise warehouse 350 comprises a primary copy of the distributed database and programs that collect and propagate replica updates. The enterprise warehouse 350 is also coupled to the data marts 360, 370 via a network. The enterprise warehouse 350 collects updates from the sources 310, 320, 330, 340 and updates the primary database. After updating the primary database, the enterprise warehouse 350 propagates the updates to the other computer systems within the data warehousing environment 300.

The data marts 360, 370 are also coupled via the network (not shown) to the analyst 380 and comprise replica databases and programs that collect and propagate replica updates. The data marts 360, 370 are also the database source for a number of department applications within the data warehouse environment 300. When a department application updates the one of the data marts' replica databases, the corresponding data mart propagates the replica update to the other computer systems within the data warehousing environment 300.

The analyst 380 comprises a replica database and programs that collect and propagate replica updates. The analyst 380 is the local database source for analyst applications within the data warehousing environment 300. When an analyst application updates the analyst's replica database, the analyst 380 propagates the replica update to the other computer systems within the data warehousing environment 300.

In another embodiment of the present invention, any one of the sources 310, 320, 330, 340, the enterprise warehouse 350, the data marts 360, 370 and the analyst 38d may be either the primary site or a secondary site for a plurality of database items in the data warehousing environment 300. In all cases, only one distributed database site may be the primary site for a particular database item.

The current update protocols used in the data warehousing environment refresh the warehouse periodically (e.g., every night), while shutting out queries from the warehouse. Alternately, the current update protocols allow queries on the warehouse and concurrently perform locking at remote sites. Clearly, both are undesirable. One embodiment of the present invention, to be described in FIG. 5, comprises a serialization system which allows the updates to be propagated without either requiring the database to go off-line or requiring transactions to acquire locks at multiple sites.

Figure 4A:
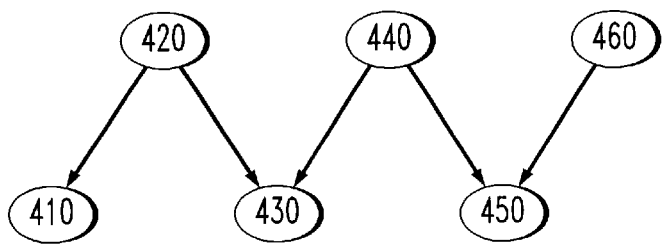
FIG. 4A illustrates an example of a directed acyclic copy graph that forms one environment within which the present invention can operate.

Turning now to FIG. 4A, illustrated is an example of a DAG, generally designated 400, that forms one environment within which the present invention can operate. The DAG 400 comprises six distributed database sites 410, 420, 430, 440, 450, 460.

The database site 420 is coupled to the database sites 410, 430 and propagates transaction updates to the database sites 410, 430. The database site 440 is coupled to the database sites 430, 450 and propagates transaction updates to the database sites 430, 450. The database site 460 is coupled to the database site 450 and propagates transaction updates to the database site 450. The database sites 410, 430, 450 are al-so classified as sink nodes since they do not have a directed edge to another database site in the DAG 400.

The problem with the DAG 400 is that it does not guarantee serializability of replica updates to the database sites using lazy updates. In one embodiment of the present invention, the present invention creates a forest from the DAG 400, as shown in FIG. 4B, and propagates updates along the edges of the forest to guarantee serializability of transactions.

Figure 4B:
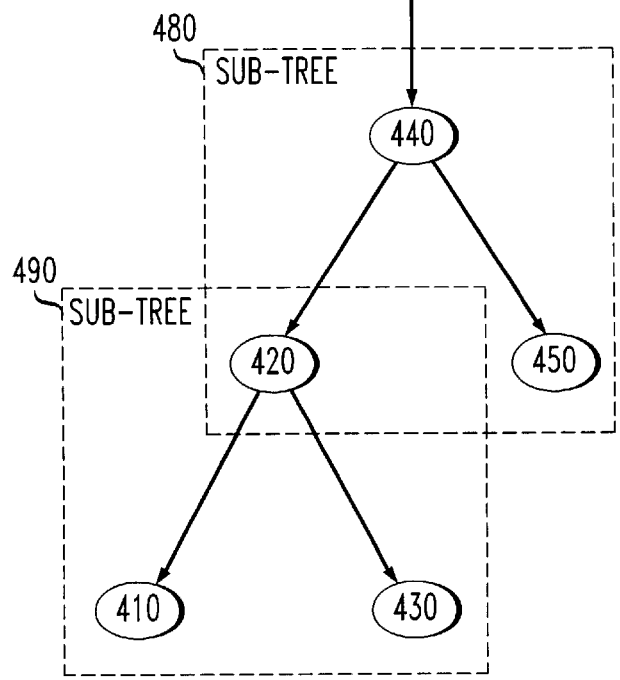
FIG. 4B illustrates a forest constructed from the directed acyclic copy graph in FIG. 4A.

Turning now to FIG. 4B, illustrated is a forest with a single tree 470, constructed from the DAG 400 in FIG. 4A. The methodology of constructing a forest from the DAG 400 is discussed in greater detail in FIG. 5.

A forest comprises one or more trees. In FIG. 4B, the forest comprises a single tree 470 with the database sites 410, 420, 430, 440, 450, 460. These database sites are the same as the DAG 400 in FIG. 4A. The single tree 470 comprise a root, edges and one or more sub-trees. The root is the starting database site for propagating updates within the single tree 470. The root of tree 470 is database site 460.

Coupled the root database site 460 via an edge is a first sub-tree 480. A sub-tree comprises a parent database site and child database sites. The first sub-tree 480 comprises a parent database site 440, a child database site 450 and a second sub-tree 490. The first sub-tree 480 also comprises edges that couple the child database site 450 and the second sub-tree 490 to the parent database site 440.

The second sub-tree 490 comprises a parent database site 420 and child database sites 410, 430. The second sub-tree 490 also comprises edges that couple the child database sites 410, 430 to the parent database site 420.

Figure 5:
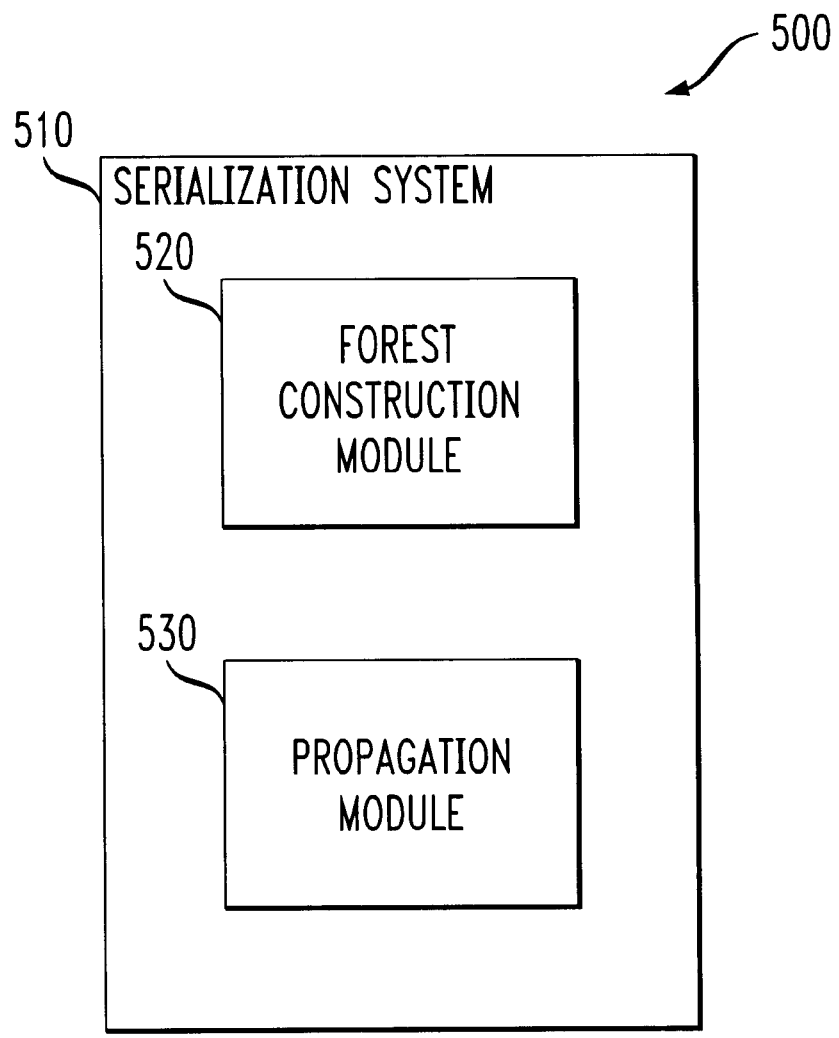
FIG. 5 illustrates a block diagram of a serialization system that ensures serialization of lazy updates in a distributed database described by a DAG.

Turning now to FIG. 5, illustrated is a block diagram of a serialization system 510 that ensures serialization of lazy updates in a distributed database described by a DAG. The serialization system 510 comprises a forest construction module 520 and a propagation module 530.

The forest construction module 520 creates a forest having at least one tree and edges from a DAG. For example, the forest construction module 520 starts with the DAG 400 in FIG. 4A and creates the forest with a single tree 470 shown in FIG. 4B. The forest construction module 520 creates a forest by first selecting an arbitrary sink node from the DAG 400. A sink node is a node in a directed acyclic copy graph that does not have a directed edge to another node in the directed acyclic-copy graph. In this example, the arbitrary sink node selected is the database site 410. The forest construction module 520 adds the selected sink node to the single tree 470 and removes the selected sink node from the DAG 400.

Next, the forest construction module 520 removes the directed edge to the database site 410 from the DAG 400. The forest construction module 520 then selects another sink node in the DAG 400, adds it to the single tree 470, removes the directed edges to the selected sink node from the DAG 400 and removes the selected sink node from the DAG 400. In this example, the next sink node selected is the database site 430.

In adding a database site to the single tree 470, the forest construction module 520 determines if the new database site was the parent of other database sites in the DAG 400. If the newly added database site was a parent, then the forest construction module 520 makes a sub-tree with the newly added database site as the parent of the sub-tree and the other database sites children of the sub-tree. Since the database site 430 was not a parent database site in the DAG 400, then the forest construction module 520 does not make a sub-tree at this time.

Next, the forest construction module 520 selects another sink node in the DAG 400, adds it to the single tree 470, removes the directed edges to the selected sink node from the DAG 400 and removes the selected sink node from the DAG 400. In this example, the DAG 400 has two sink nodes 420, 450. The database site 420 is a sink node because the directed edges to the database sites 410, 430 were removed previously. In this example, the next sink node selected is the database site 420.

The forest construction module 520 then determines if the database site 420 was a parent of other database sites in the DAG 400. Since the database site 420 was a parent database site, the forest construction module 520 creates the second sub-tree 490 with the database site 420 as the parent of the second sub-tree 490. The children of the second sub-tree 490 are the database sites 410, 430. (See FIG. 4B).

Next, the forest construction module 520 selects another sink node in the DAG 400, adds it to the single tree 470, removes the directed edges to the selected sink node from the DAG 400 and removes the selected sink node from the DAG 400. At this stage, the DAG 400 has one sink node 450. In this example, the next sink node selected is the database site 450. Since the database site 450 was not a parent of any other database sites in the DAG 400, the forest construction module 520 does not create a sub-tree.

The forest construction module 520 next selects another sink node in the DAG 400, adds it to the single tree 470, removes the directed edges to the selected sink node from the DAG 400 and removes the selected sink node from the DAG 400. At this stage, the DAG 400 has two sink nodes 440, 460. In this example, the next sink node selected is the database site 440.

Since the database site 440 was a parent database site, the forest construction module 520 creates the first sub-tree 480 with the database site 440 as the parent of the first sub-tree 480. The children of the first sub-tree 480 are the database site 450 and the second sub-tree 490. (see FIG. 4B).

The second sub-tree 490 is a child of the first sub-tree 480 because each parent database site in the single tree 470 has to have a path to the same database sites that the parent database site had an edge to in the DAG 400. A path comprises one or more edges that connect a source database site to a destination database site. A path may also comprise one or more intermediate database sites.

Since the database site 440 had a directed edge to the database site 430 in the DAG 400, the single tree 470 has to have a path from the database site 440 to the database site 430. In this case, adding the second sub-tree 490 as a child to the first sub-tree 480 creates a path from the database site 440 to the database site 420 and then to the database site 430.

Next, the forest construction module 520 selects another sink node in the DAG 400, adds it to the single tree 470, removes the directed edges to the selected sink node from the DAG 400 and removes the selected sink node from the DAG 400. At this stage, the DAG 400 has only the database site 460. In this example, the next sink node selected is the database site 460.

Since the database site 460 had a directed edge to the database site 450 in the DAG 400, the single tree 470 has to have a path from the database site 460 to the database site 450. The forest construction module 520 makes the database site 460 the parent of the database site 440. This creates a path from the database site 460 to the database site 440 and then to the database site 450.

Since there are no more database sites remaining in the DAG 400, no additional database sites can be added to the single tree 470. Next the forest construction module 520 makes the database site 460 the root of the single tree 470. The forest construction module 520 has completed construction of the forest 470.

In an alternate embodiment of the present invention, the forest construction module 520 creates a forest that comprises an undirected acyclic copy graph ("UAG"). The UAG is created by the forest construction module 520 starting with a DAG and removing the directions on the edges of the DAG resulting in an undirected copy graph ("UCG"). Next, the forest construction module 520 removes edges from the UCG until the UCG becomes acyclic and results in the UAG. Note that when an edge is removed from the UCG, there must remain a path in the UCG to the sites previously connected by the edge. For example, if site A is connected site B by an edge and the edge is removed, there must be a path in the UAG from site A to site B. This may require adding one or more edges between sites that do not make the UAG cyclic.

Associated with the forest construction module 520 is the propagation module 530. The propagation module 530 propagates lazy updates along the edges of the forest created by the forest construction module 520 to ensure serialization.

The propagation module 530 executes a transaction at a single site and when the transaction commits, the propagation module 530 forwards the transaction's updates to the children of that site. The transaction that occurs at the single site is referred to as a primary sub-transaction.

The transaction's updates that are forwarded to the children of the single site are called secondary sub-transactions. When a site receives a secondary sub-transaction, the site will only apply those transaction items which have replicas at this site. In another embodiment of the present invention, the propagation module 530 only forwards secondary sub-transactions to the relevant children of a site. A child is relevant for a sub-transaction if either the child or one of its descendants contains a replica of an item that the sub-transaction has updated.

Furthermore, the forwarded secondary sub-transactions from a parent are committed at a site in the order in which they are received at the site, and are in turn forwarded to the site's children. The forwarding of both primary and secondary sub-transactions at a site is done atomically with respect to commit. That is, if transaction 1 ($T_1$) commits before transaction 2 ($T_2$) at a site, then $T_1$ is forwarded before $T_2$ to the site's children.

The advantage of using the forest construction module 520 and the propagation module 530 is that by propagating secondary sub-transactions sequentially along the edges of the forest, the serialization system 510 ensures that when a secondary sub-transaction for a particular transaction is executed at a site, all transactions preceding it in the serialization order have committed at the site.

One skilled in the art should know that the present invention is not limited to constructing the forest 470 in FIG. 4B from the DAG in FIG. 4A. Nor is the present invention limited to the order in which the forest construction module 520 constructed the forest 470. Also, other methods of constructing a forest from a directed acyclic graph are within the scope of this invention. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A system for ensuring serialization of lazy updates in a distributed database described by a directed acyclic copy graph, comprising:

a forest construction module that creates a forest having trees and edges from said directed acyclic copy graph; and a propagation module, associated with said forest construction module, that employs said edges of said forest to propagate said lazy updates among replicas in said distributed database and ensure said serialization.

2. The system as recited in claim 1 wherein each of said trees comprises a node with exactly one parent.

3. The system as recited in claim 1 wherein said propagation module propagates said lazy updates without employing timestamps.

4. The system as recited in claim 1 wherein said forest construction module arbitrarily selects a sink node of said forest.

5. The system as recited in claim 1 wherein said propagation module propagates transactions within a child tree of said forest only to selected children of said child tree.

6. The system as recited in claim 1 wherein said propagation module propagates transactions sequentially along edges of said forest.

7. The system as recited in claim 1 wherein a counterpart of said system is located at each replica of said distributed database.

8. A method of ensuring serialization of lazy updates in a distributed database described by a directed acyclic copy graph, comprising:

creating a forest having trees and edges from said directed acyclic copy graph; and employing said edges of said forest to propagate said lazy updates among replicas in said distributed database and ensure said serialization.

9. The method as recited in claim 8 wherein each of said trees comprises a node with exactly one parent.

10. The method as recited in claim 8 wherein said employing comprises propagating said lazy updates without employing timestamps.

11. The method as recited in claim 8 wherein said creating comprises arbitrarily selecting a sink node of said forest.

12. The method as recited in claim 8 wherein said employing comprises propagating transactions within a child tree of said forest only to selected children of said child tree.

13. The method as recited in claim 8 wherein said employing comprises propagating transactions sequentially along edges of said forest.

14. The method as recited in claim 8 wherein said method is carried out at each replica of said distributed database.

15. A distributed database described by a directed acyclic copy graph, comprising:

at least two primary sites;

at least two secondary sites; and a system for ensuring serialization of lazy updates among said at least two primary site and said at least two secondary sites, including:

a forest construction module that creates a forest having trees and edges from said directed acyclic copy graph, and a propagation module, associated with said forest construction module, that employs said edges of said forest to propagate said lazy updates among replicas in said distributed database and ensure said serialization.

16. The distributed database as recited in claim 15 wherein each of said trees comprises a node with exactly one parent.

17. The distributed database as recited in claim 15 wherein said propagation module propagates said lazy updates without employing timestamps.

18. The distributed database as recited in claim 15 wherein said forest construction module arbitrarily selects a root of said forest.

19. The distributed database as recited in claim 15 wherein said propagation module propagates transactions within a child tree of said forest only to selected children of said child tree.

20. The distributed database as recited in claim 15 wherein said propagation module propagates transactions sequentially along edges of said forest.

21. The distributed database as recited in claim 15 wherein a counterpart of said system is located at said at least two primary site and said at least two secondary sites.

22. A system for ensuring serialization of lazy updates in a distributed database described by a directed acyclic copy graph, comprising:

a forest construction module that creates a forest including an undirected acyclic copy graph having edges from said directed acyclic copy graph; and a propagation module, associated with said forest construction module, that employs said edges of said forest to propagate said lazy updates among replicas in said distributed database and ensure said serialization.

23. The system as recited in claim 22 wherein said propagation module propagates said lazy updates without employing timestamps.

24. The system as recited in claim 22 wherein said edges are undirected.

25. The system as recited in claim 22 wherein said propagation module propagates transactions sequentially along edges of said forest.

26. The system as recited in claim 22 wherein a counterpart of said system is located at each replica of said distributed database.

* * * * *